W. LAWRENCE.
AUTOMOBILE FARM WAGON.
APPLICATION FILED APR. 29, 1911.
1,050,147.
Patented Jan. 14, 1913.
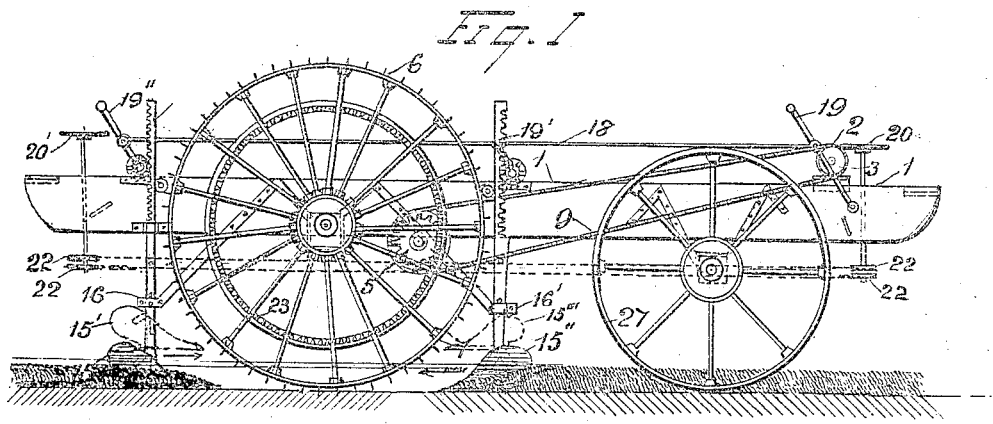
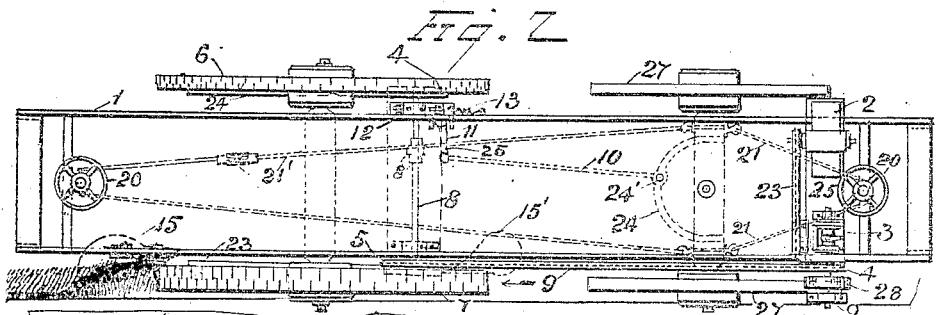
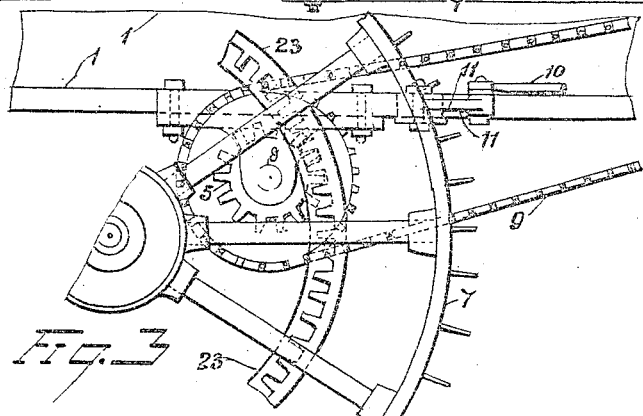
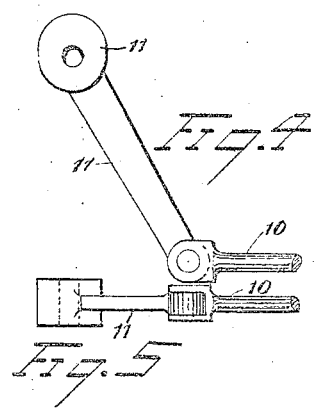
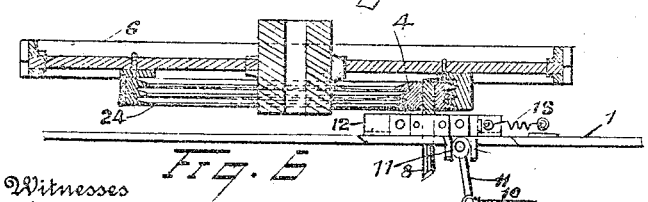
Witnesses
M. I. Shafer
M. G. Herbert
Inventor
William Lawrence

UNITED STATES PATENT OFFICE.

WILLIAM LAWRENCE, OF WASHINGTON, DISTRICT OF COLUMBIA.

AUTOMOBILE FARM-WAGON.

1,050,147.  Specification of Letters Patent.  Patented Jan. 14, 1913.

Application filed April 29, 1911. Serial No. 624,119.

*To all whom it may concern:*

Be it known that I, WILLIAM LAWRENCE, a citizen of the United States, residing at Washington, District of Columbia, have invented a new and useful Automobile Farm-Wagon, of which the following is the specification.

My invention relates to a means of performing plowing and similar work in which is included a motor driven vehicle to which the plow or other farm implement is attached, and the object of my invention is to provide an efficient and comparatively inexpensive substitute for animal power in the operations referred to.

I attain the above object by means illustrated in the accompanying drawing in which:

Figure 1 is a side elevation of my automobile plowing vehicle showing the plows in position: Fig. 2 is a top view of the same: Fig. 3 shows the means of propelling the vehicle by the application of a positive gearing applied to one hind wheel of the vehicle: Fig. 4 is a top view of the cam lever that serves to release the friction driving pinion from the friction spur gear that actuates the outer hind driving wheel of the vehicle: Fig. 5 is a side view of the same: Fig. 6 is a sectional view of the friction or non-positively driven hind wheel on the outer side.

Similar numerals refer to similar parts throughout the several views.

The automobile plowing vehicle consists of a wagon 1, a motor 2, attached to a base 25, that is secured to the wagon 1. A reversing clutch mechanism 3, driven by a belt is also secured to the base 25. The clutch shaft has a pulley 4, that actuates a belt 9 so as to turn a gear pinion 5 which meshes in a spur gear 23 secured to the driving wagon wheel 7, that mainly contributes to the traction of the vehicle to which the plows 15 and 15' are attached as nearly as possible to the driving side. The clutch mechanism 3, being reversible, enables the vehicle to be driven either forward or reverse without turning the wagon. Projecting ribs are on the outer peripheries of the driving wheels 6 and 7, these grip the soil to give adhesion. Steering wheels 20 operate connecting rods or chains 21 and 21' secured to the forward axle so as to steer in either direction and so enable the driver to easily observe the plowing.

A mechanism for enabling the wagon to turn to right or left consists of a friction pinion 4 on a jointed shaft 8, pivoted in a slidable pillow block 12. This sliding is regulated by a cam and lever 11, operated from the fifth wheel that actuates a rod 10, attached to the cam lever 11. A spring 13, keeps the pinion in frictional contact with the spur 24. The shaft 8 carries the positive pinion 5 that drives the wheel 7 by means of the spur gear 23. In plowing, the levers 19, 19', 19'' enable the driver to regulate the plowing. The plow not in use is disconnected.

An essential feature of my invention is that of the positively driven hind wagon wheel that runs in the furrow made by a previous plowing, thus affording a uniform grip on the soil by the ribbed projections on the positive driving wheel. The line of pull on the plow is close to the center line of the positive driving wheel which thus minimizes strains on the vehicle and confines them to the wagon side specially constructed to sustain them.

In plowing around the land, I first make a furrow of uniform depth, with the wagon in forward movement using the rear plow 15, the driving wheel runs in this furrow and guides the plow for the next one, the sod being turned behind the wheel. In case of steep hillside plowing where the work is to and fro and not around the land, two plows are preferable, each of which is controllable by the driver who changes his seat so as to enable him to observe the plowing without difficulty. A pulley 28 serves to carry a driving belt to operate stationary machinery by the motor. Portable machinery carried on the vehicle can also be driven thereby.

What I claim as my invention and desire to secure by Letters Patent is:

1. In an automobile farm wagon the combination of a motor, a suitable reversing mechanism attached to the wagon body, means of revolving a positively actuating hind driving wheel of the wagon to propel the latter on curved roads, a non positively driven hind wheel co-acting with the previously named wheel, means of releasing the said non-positively driven and loosely revoluble wheel when the vehicle is being turned, a suitable steering gear applied to the forward axle of the wagon, loosely revoluble wheels on said axle, also operative means of steering and otherwise controlling the mechanism of the vehicle and attachments by a driver on the vehicle, the arrangement of the wagon parts being such that the center of effort or pull is located as nearly as possible to the positively driven hind wheel of the wagon.

2. In an automobile farm vehicle, the combination of a motor, a reversing mechanism, an operative connection from the shaft of the reversing mechanism to the positive acting gear pinion that meshes in a spur gear secured to a hind wheel of the vehicle, a non positively driven hind wheel loosely revoluble on its axle, a non positive spur gear secured to said wheel, a pinion gear meshing therein, a jointed shaft carrying said pinion, a suitable means of releasing said pinion gear from contact with the spur gear aforesaid, a shaft connected with the jointed shaft revolubly mounted on the vehicle body and joined to the positively acting gear pinion shaft co-acting with the same to propel the vehicle, a steering gear applied to the forward axle having loosely revoluble wheels mounted thereon, a suitable connection from the steering gear on forward axle to steering wheels at each end of the wagon controllable by the driver, a suitable connection from the outer slidable support of the non positive pinion shaft to the forward axle or fifth wheel serving as a releasing device for the non-positively driven wheel when the vehicle is being turned.

3. In an automobile farm wagon having a motor, a reversing mechanism, an operative connection from the shaft of the reversing mechanism to the positive acting gear pinion that meshes in a spur gear secured to a hind wheel of the vehicle, a non positively driven hind wheel loosely revoluble on its axle, a non positively driven spur gear secured to said wheel, a pinion gear meshing therein, a jointed shaft carrying said pinion, a suitable means of releasing said pinion gear from contact with the spur gear aforesaid, a shaft connected with the jointed shaft revolubly mounted on the vehicle body and joined to the positively acting gear pinion shaft co-acting with the same to propel the vehicle, a steering gear applied to the forward axle that has loosely revoluble wheels mounted thereon, a suitable connection from the steering gear on the forward axle to steering wheels placed at each end of the vehicle and controlled by the driver, a suitable connection from the outer slidable support of the non positive pinion shaft to the forward axle or fifth wheel, serving as a releasing device for the non-positively driven wheel when the vehicle is being turned, suitable levers for use in starting, stopping, or reversing the movement of the wagon by aid of the driver only when so required, in combination with the re-inforced side of the wagon to which is secured the driving belt gear, together with suitable means of attaching and manipulating certain farm implements the line of pull or traction of which implements being suitably placed as close as possible to the positively driven traction wheel of the vehicle, substantially as and for the purpose herein specified.

In testimony, that I claim the foregoing as my own, I have hereto affixed my signature in the presence of two witnesses.

WILLIAM LAWRENCE.

Witnesses:
 JOHN H. SIGGERS,
 M. I. SHAFER.